United States Patent [19]
Yoshida et al.

[11] Patent Number: 4,894,843
[45] Date of Patent: Jan. 16, 1990

[54] DATA COMMUNICATION SYSTEM

[75] Inventors: Takehiro Yoshida; Takuji Nakatsuma, both of Tokyo, Japan

[73] Assignee: Canon Kabushiki Kaisha, Tokyo, Japan

[21] Appl. No.: 915,430

[22] Filed: Oct. 6, 1986

[30] Foreign Application Priority Data

Oct. 7, 1985 [JP] Japan .................................. 60-221882
Oct. 25, 1985 [JP] Japan .................................. 60-239037
Aug. 14, 1986 [JP] Japan .................................. 61-191482

[51] Int. Cl.$^4$ .......................... H04N 1/21; H04N 1/32
[52] U.S. Cl. .......................................... 375/8; 358/434; 375/121; 379/100
[58] Field of Search .......................... 375/37, 121, 7, 8; 178/2, 2 F, 3, 23 R, 24, 25; 358/84, 256, 257, 305, 285; 455/2, 49, 50, 51; 379/90, 96, 100, 111; 340/825.15

[56] References Cited

U.S. PATENT DOCUMENTS

| | | | |
|---|---|---|---|
| 3,487,312 | 12/1969 | Egan et al. | 455/62 |
| 4,251,691 | 2/1981 | Kakihara et al. | 379/96 |
| 4,255,619 | 3/1981 | Saito | 379/96 |
| 4,413,285 | 11/1983 | Anzai et al. | 358/285 |
| 4,524,393 | 6/1985 | Ohzeki | 358/257 |
| 4,581,656 | 4/1986 | Wada | 358/257 |
| 4,612,594 | 9/1986 | Yamaura et al. | 455/51 |
| 4,672,460 | 6/1987 | Tsuda | 340/825.14 |

OTHER PUBLICATIONS

"Fido's Complete Operating Manual" 4th Edition, Aug. 1985 (P1).

Primary Examiner—Benedict V. Safourek
Attorney, Agent, or Firm—Fitzpatrick, Cella, Harper & Scinto

[57] ABSTRACT

A data communication system includes a receiver, a transmitter, an NCU, a control circuit, and a display circuit. In the send or receive mode, the number of remaining sheets or the time for sending or receiving such sheets is calculated and displayed on the display circuit under the control of the control circuit.

16 Claims, 16 Drawing Sheets

FIG. 5A

| SEND MODE | IMAGE SEND MODE | SIZE OF ORIGINAL SENT REALLY | SENDING SPEED (ONLY G3) | ENCODING TYPE (ONLY G3) | MINIMUM SEND TIME (ONLY G3) | SEND TIME REQUIRED FOR ONE PAGE OF STANDARD ORIGINAL SHEET |
|---|---|---|---|---|---|---|
| G2 | STANDARD | A4 | --- | --- | --- | 190sec |
| G3 | STANDARD | A4 | 2400b/s | MH | 0msec | 56sec |
| | | | | MH | 10msec | 59sec |
| | | | | MH | 20msec | 63sec |
| | | | | MR | 0msec | 46sec |
| | | | | MR | 10msec | 52sec |
| | | | | MR | 20msec | 56sec |
| | | | 4800b/s | MH | 0msec | 28sec |
| | | | | MH | 10msec | 30sec |
| | | | | MH | 20msec | 38sec |
| | | | | MR | 0msec | 19sec |
| | | | | MR | 10msec | 24sec |
| | | | | MR | 20msec | 33sec |
| | | | 7200b/s | MH | 0msec | 19sec |
| | | | | MH | 10msec | 24sec |
| | | | | MH | 20msec | 33sec |
| | | | | MR | 0msec | 15sec |
| | | | | MR | 10msec | 20sec |
| | | | | MR | 20msec | 30sec |

FIG. 5B

| SEND MODE | IMAGE SEND MODE | SIZE OF ORIGINAL SENT REALLY | SENDING SPEED (ONLY G3) | ENCODING TYPE (ONLY G3) | MINIMUM SEND TIME (ONLY G3) | SEND TIME REQUIRED FOR ONE PAGE OF STANDARD ORIGINAL SHEET |
|---|---|---|---|---|---|---|
| G3 | STANDARD | A4 | 9600b/s | MH | 0msec | 14sec |
| | | | | | 10msec | 19sec |
| | | | | | 20msec | 28sec |
| | | | | MR | 0msec | 10sec |
| | | | | | 10msec | 16sec |
| | | | | | 20msec | 26sec |
| | | B4 | 2400b/s | MH | 0msec | 88sec |
| | | | | | 10msec | 92sec |
| | | | | | 20msec | 98sec |
| | | | | MR | 0msec | 72sec |
| | | | | | 10msec | 81sec |
| | | | | | 20msec | 88sec |
| | | | 7200b/s | MH | 0msec | 44sec |
| | | | | | 10msec | 47sec |
| | | | | | 20msec | 59sec |
| | | | | MR | 0msec | 30sec |
| | | | | | 10msec | 38sec |
| | | | | | 20msec | 52sec |

FIG. 5C

| SEND MODE | IMAGE SEND MODE | SIZE OF ORIGINAL SENT REALLY | SENDING SPEED (ONLY G3) | ENCODING TYPE (ONLY G3) | MINIMUM SEND TIME (ONLY G3) | SEND TIME REQUIRED FOR ONE PAGE OF STANDARD ORIGINAL SHEET |
|---|---|---|---|---|---|---|
| G3 | STANDARD | B4 | 7200b/s | MH | 0msec | 30sec |
| | | | | | 10msec | 38sec |
| | | | | | 20msec | 52sec |
| | | | | MR | 0msec | 23sec |
| | | | | | 10msec | 31sec |
| | | | | | 20msec | 47sec |
| | | | 9600b/s | MH | 0msec | 22sec |
| | | | | | 10msec | 30sec |
| | | | | | 20msec | 44sec |
| | | | | MR | 0msec | 16sec |
| | | | | | 10msec | 25sec |
| | | | | | 20msec | 41sec |
| | | A3 | 2400b/s | MH | 0msec | 126sec |
| | | | | | 10msec | 133sec |
| | | | | | 20msec | 142sec |
| | | | | MR | 0msec | 104sec |
| | | | | | 10msec | 117sec |
| | | | | | 20msec | 126sec |

FIG. 5D

| SEND MODE | IMAGE SEND MODE | SIZE OF ORIGINAL SENT REALLY | SENDING SPEED (ONLY G3) | ENCODING TYPE (ONLY G3) | MINIMUM SEND TIME (ONLY G3) | SEND TIME REQUIRED FOR ONE PAGE OF STANDARD ORIGINAL SHEET |
|---|---|---|---|---|---|---|
| G3 | STANDARD | A3 | 4800b/s | MH | 0msec | 63sec |
| | | | | | 10msec | 68sec |
| | | | | | 20msec | 86sec |
| | | | | MR | 0msec | 43sec |
| | | | | | 10msec | 54sec |
| | | | | | 20msec | 74sec |
| | | | 7200b/s | MH | 0msec | 43sec |
| | | | | | 10msec | 54sec |
| | | | | | 20msec | 74sec |
| | | | | MR | 0msec | 34sec |
| | | | | | 10msec | 45sec |
| | | | | | 20msec | 68sec |
| | | | 9600b/s | MH | 0msec | 32sec |
| | | | | | 10msec | 43sec |
| | | | | | 20msec | 63sec |
| | | | | MR | 0msec | 23sec |
| | | | | | 10msec | 36sec |
| | | | | | 20msec | 59sec |

FIG. 5E

| SEND MODE | IMAGE SEND MODE | SIZE OF ORIGINAL SENT REALLY | SENDING SPEED (ONLY G3) | ENCODING TYPE (ONLY G3) | MINIMUM SEND TIME (ONLY G3) | SEND TIME REQUIRED FOR ONE PAGE OF STANDARD ORIGINAL SHEET |
|---|---|---|---|---|---|---|
| G3 | FINE | A4 | 2400b/s | MH | 0msec | 112sec |
| | | | | | 10msec | 118sec |
| | | | | | 20msec | 126sec |
| | | | | MR | 0msec | 92sec |
| | | | | | 10msec | 104sec |
| | | | | | 20msec | 112sec |
| | | | 4800b/s | MH | 0msec | 56sec |
| | | | | | 10msec | 60sec |
| | | | | | 20msec | 76sec |
| | | | | MR | 0msec | 38sec |
| | | | | | 10msec | 48sec |
| | | | | | 20msec | 66sec |
| | | | 7200b/s | MH | 0msec | 38sec |
| | | | | | 10msec | 48sec |
| | | | | | 20msec | 66sec |
| | | | | MR | 0msec | 30sec |
| | | | | | 10msec | 40sec |
| | | | | | 20msec | 60sec |

FIG. 5F

| SEND MODE | IMAGE SEND MODE | SIZE OF ORIGINAL SENT REALLY | SENDING SPEED (ONLY G3) | ENCODING TYPE (ONLY G3) | MINIMUM SEND TIME (ONLY G3) | SEND TIME REQUIRED FOR ONE PAGE OF STANDARD ORIGINAL SHEET |
|---|---|---|---|---|---|---|
| G3 | FINE | A4 | 9600b/s | MH | 0msec | 28sec |
| | | | | | 10msec | 38sec |
| | | | | | 20msec | 56sec |
| | | | | MR | 0msec | 20sec |
| | | | | | 10msec | 32sec |
| | | | | | 20msec | 52sec |
| | | B4 | 2400b/s | MH | 0msec | 176sec |
| | | | | | 10msec | 184sec |
| | | | | | 20msec | 196sec |
| | | | | MR | 0msec | 144sec |
| | | | | | 10msec | 162sec |
| | | | | | 20msec | 176sec |
| | | | 7200b/s | MH | 0msec | 88sec |
| | | | | | 10msec | 94sec |
| | | | | | 20msec | 118sec |
| | | | | MR | 0msec | 60sec |
| | | | | | 10msec | 76sec |
| | | | | | 20msec | 104sec |

FIG. 5G

| SEND MODE | IMAGE SEND MODE | SIZE OF ORIGINAL SENT REALLY | SENDING SPEED (ONLY G3) | ENCODING TYPE (ONLY G3) | MINIMUM SEND TIME (ONLY G3) | SEND TIME REQUIRED FOR ONE PAGE OF STANDARD ORIGINAL SHEET |
|---|---|---|---|---|---|---|
| G3 | FINE | B4 | 7200b/s | MH | 0msec | 60sec |
| | | | | | 10msec | 76sec |
| | | | | | 20msec | 104sec |
| | | | | MR | 0msec | 46sec |
| | | | | | 10msec | 62sec |
| | | | | | 20msec | 94sec |
| | | | 9600b/s | MH | 0msec | 44sec |
| | | | | | 10msec | 60sec |
| | | | | | 20msec | 88sec |
| | | | | MR | 0msec | 32sec |
| | | | | | 10msec | 50sec |
| | | | | | 20msec | 82sec |
| | | A3 | 2400b/s | MH | 0msec | 252sec |
| | | | | | 10msec | 266sec |
| | | | | | 20msec | 284sec |
| | | | | MR | 0msec | 208sec |
| | | | | | 10msec | 234sec |
| | | | | | 20msec | 252sec |

FIG. 5H

| SEND MODE | IMAGE SEND MODE | SIZE OF ORIGINAL SENT REALLY | SENDING SPEED (ONLY G3) | ENCODING TYPE (ONLY G3) | MINIMUM SEND TIME (ONLY G3) | SEND TIME REQUIRED FOR ONE PAGE OF STANDARD ORIGINAL SHEET |
|---|---|---|---|---|---|---|
| G3 | FINE | A3 | 4800b/s | MH | 0msec | 126sec |
| | | | | | 10msec | 136sec |
| | | | | | 20msec | 172sec |
| | | | | MR | 0msec | 86sec |
| | | | | | 10msec | 108sec |
| | | | | | 20msec | 148sec |
| | | | 7200b/s | MH | 0msec | 86sec |
| | | | | | 10msec | 108sec |
| | | | | | 20msec | 148sec |
| | | | | MR | 0msec | 68sec |
| | | | | | 10msec | 90sec |
| | | | | | 20msec | 136sec |
| | | | 9600b/s | MH | 0msec | 64sec |
| | | | | | 10msec | 86sec |
| | | | | | 20msec | 126sec |
| | | | | MR | 0msec | 46sec |
| | | | | | 10msec | 72sec |
| | | | | | 20msec | 118sec |

DATA COMMUNICATION SYSTEM

BACKGROUND OF THE INVENTION

1. Field of the Invention

The present invention relates to a data communication apparatus or system.

2. Related Background Art

A conventional system for causing an LCD (Liquid Crystal Display) element to display a communication mode on a displaying means is known as a typical data communication system.

However, it is impossible to determine a remaining image send time in a conventional data communication system. If original sheets are set in and sequentially sent by the data communication system, the remaining send time may be roughly estimated by the number of remaining pages. However, if image data stored in a memory is automatically simultaneously sent to a plurality of destinations, the sender or operator cannot determine the remaining image sent time.

In view of the above, the operator who has an original to be sent may return from the location of the data communication system to his seat since the system is sending another original although sending of this other original will finish within one minute. The operator who has an original to be sent next may have to wait near the data communication system for a long period of time. In this manner, the data communication system cannot be always used conveniently.

SUMMARY OF THE INVENTION

It is an object of the present invention to provide an improvement in a data communication system.

It is another object of the present invention to eliminate the conventional drawbacks described above.

It is still another object of the present invention to signal a data communication end timing during data communication to the operator.

It is still another object of the present invention to allow effective use of a data communication system.

It is still another object of the present invention to display a time required for data communication.

The above and other objects, features, and advantages of the present invention will be apparent from the following preferred embodiments in conjunction with the accompanying drawings.

BRIEF DESCRIPTION OF THE DRAWINGS

FIGS. 5A to 5H are tables for calculating the times required for sending each page of a standard original under predetermined send conditions, respectively;

DETAILED DESCRIPTION OF THE PREFERRED EMBODIMENTS

Preferred embodiments of the present invention will be described in detail with reference to the accompanying drawings.

A first embodiment will be described below. The first embodiment exemplifies a facsimile system. The transmitter of the facsimile system can perform packet sending, and the receiver thereof does not perform packet reception but real-time reception.

Figure 1:
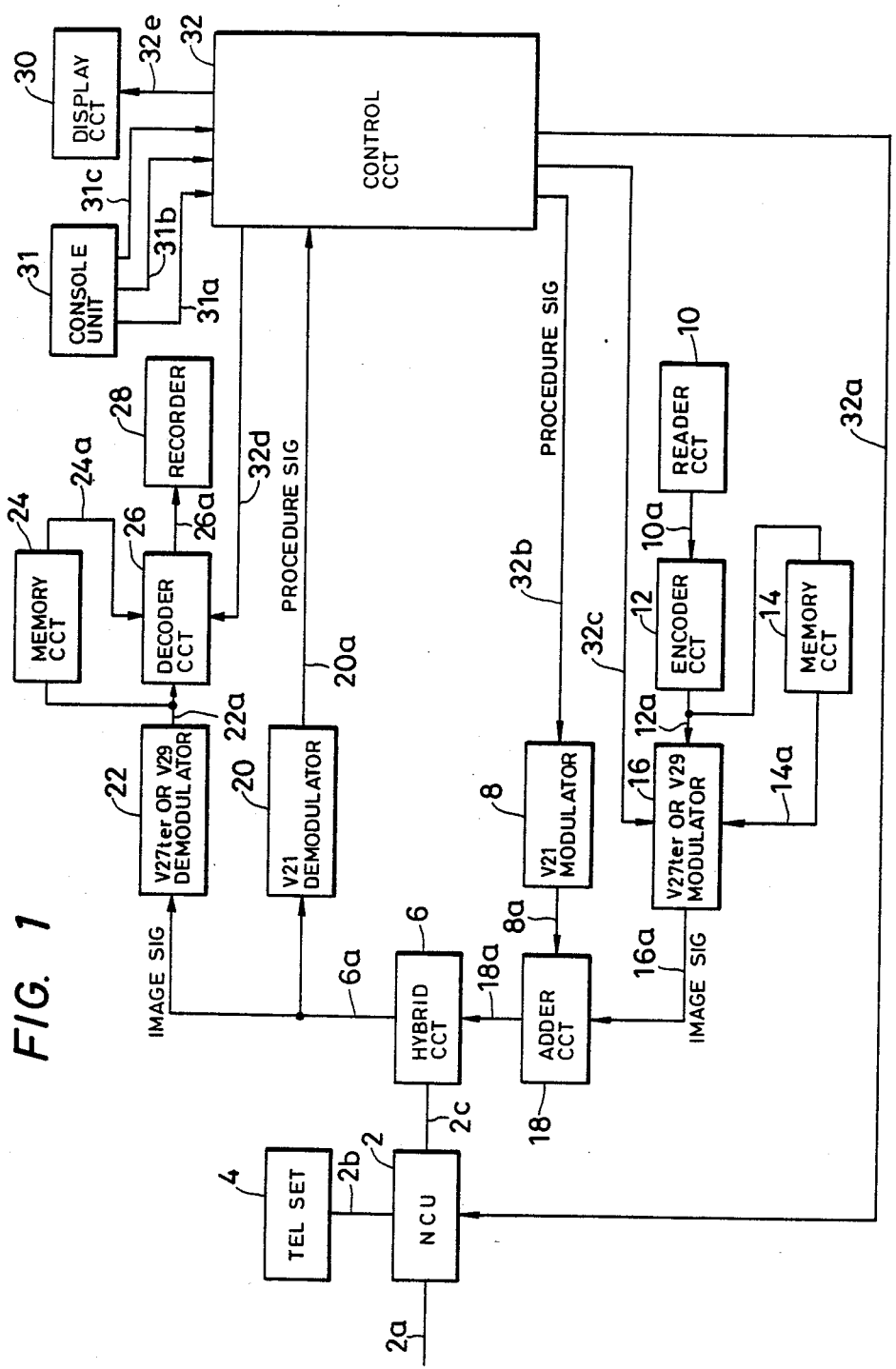
FIG. 1 is a block diagram of a data communication system according to a first embodiment of the present invention.

FIG. 1 is a block diagram of the facsimile system of the first embodiment. An NCU (Network Control Unit) 2 controls connections of a telephone network to a circuit terminal and switching of connections to a data transmission line so as to utilize the telephone network for data communication. The NCU 2 also cooperates to hold a communication loop. A telephone circuit or telephone line 2a is connected to the NCU 2. A communication control telephone set 4 is connected to the NCU 2 through a signal line 2b. The NCU 2 is controlled by a control circuit 32 such as microcomputer through a signal line 32a. If the signal line 32a is set at logic level "1", the NCU 2 connects the telephone circuit 2a to the telephone set 4. However, if the signal line 32a is set at logic level "0", the NCU 2 connects the circuit 2a to a hybrid circuit 6 through a signal line 2c.

The hybrid circuit 6 separates a send signal from a receive signal. A signal appearing on the signal line 2c is sent onto a signal line 6a. A signal appearing on a signal line 18a is sent onto the signal line 2c. Therefore, the input of the receiver is connected to the signal line 6a, and the output of the transmitter is connected to the signal line 18a.

The transmitter will be described below.

The send signals are classified into a communication control procedure signal and an image signal.

Each procedure signal complying with the CCITT (International Consulative Committee for Telephone and Telegraph) recommendations is generated by the control circuit 32. The procedure signal is modulated by a V21 modulator 8 complying with the CCITT Recommendation V21 through a signal line 32b. The modulated procedure signal is input to an adder circuit 18 through a signal line 8a and to the hybrid circuit 6 through the signal line 18a.

Original image information is read by a reader circuit 10 using a CCD line sensor. The read data is encoded into a modified Huffman code by an encoder circuit 12 through a signal line 10a. This code is directly input to a memory circuit 14 and a V27ter or V29 modulator 16.

The modulator 16 selects one of the outputs from the encoder circuit 12 and memory circuit 14 and performs differential phase modulation or orthogonal modulation complying with the CCITT Recommendation V27ter or V29. Input selection control is performed by the control circuit 32 through the signal line 32c. More specifically, if the signal line 32c is set at logic level "0", the modulator 16 receives the output from the encoding circuit 12 through the signal line 12a. However, if the signal line 32b is set at logic level "1", the image data stored in the memory circuit 14 is received by the modulator 16 through a signal line 14a.

The modulated result of the modulator 16 is input to the adder circuit 18 through the signal line 16a. The adder circuit 18 outputs a sum signal of the image signal and the procedure signal through the hybrid circuit 6.

The receiver of the facsimile system is arranged as follows.

The procedure signal output from the hybrid circuit 6 is demodulated by a demodulator 20 having the same system as that of the modulator 8. The procedure signal demodulated as digital data is input to the control circuit 32.

The image signal is demodulated by a demodulator 22 having the same system as that of the modulator 16. The demodulated image signal is input to a memory circuit 24 or a decoder circuit 26. The decoder circuit 26 performs decoding on the basis of a decoding scheme corresponding to the encoding scheme of the encoder circuit 12 and selects one of the direct input from the demodulator 22 and the output from the memory circuit 24 to decode the selected input. The input signal selection is performed in response to a control signal supplied from the control circuit 32 through a signal line 32d. If the signal line 32d is set at logic level "0", the decoder circuit 26 receives the output from the demodulator 22 without modification through the signal line 22a. However, if the signal line 32d is set at logic level "1", the decoder circuit 26 receives the image data from the memory circuit 24 through a signal line 24a.

The decoded image data is recorded at a recorder circuit 28 constituted by a thermal printer or the like.

A display circuit 30 and a control unit 31 are connected to the control circuit 32 so as to perform control operation to be described later.

The display circuit 30 comprises a liquid crystal display element and displays the number of remaining sheets to be sent. The LCD display circuit 30 is also used to display communication information.

The control unit 31 includes a keyboard panel having input keys such as numerical keys, letter keys, a start/stop key, symbol keys and the like and is used for known communication control (e.g., registration of telephone numbers) in addition to control operations to be described later. Letter key input data is supplied to the control circuit 32 through the signal line 31a; numerical input data, through the signal line 31b; and a start/stop or symbolic input data such as "#" and "*", through the signal line 31c.

Figure 2:
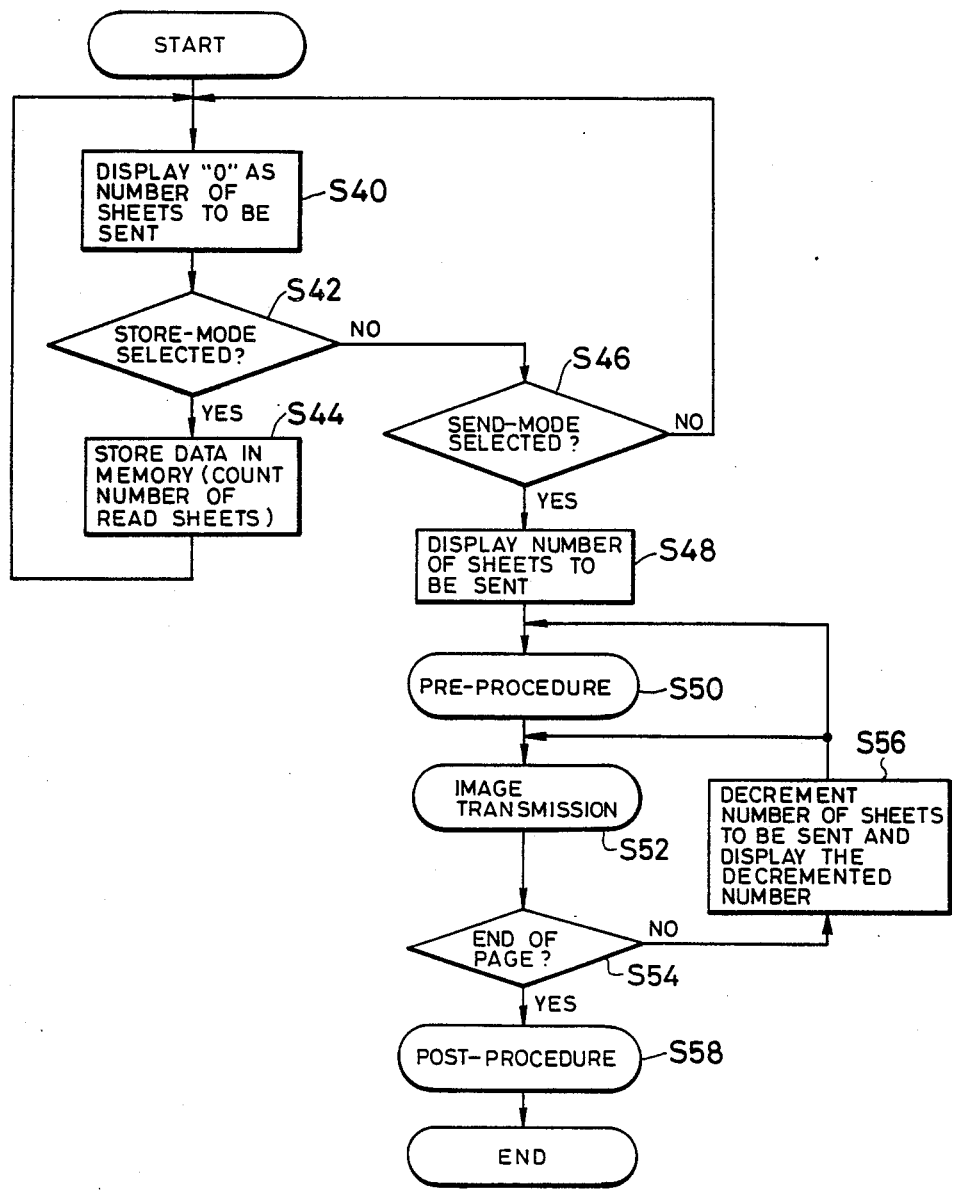
FIGS. 2 and 3 are flow charts for explaining the operation of the first embodiment.
Figure 3:
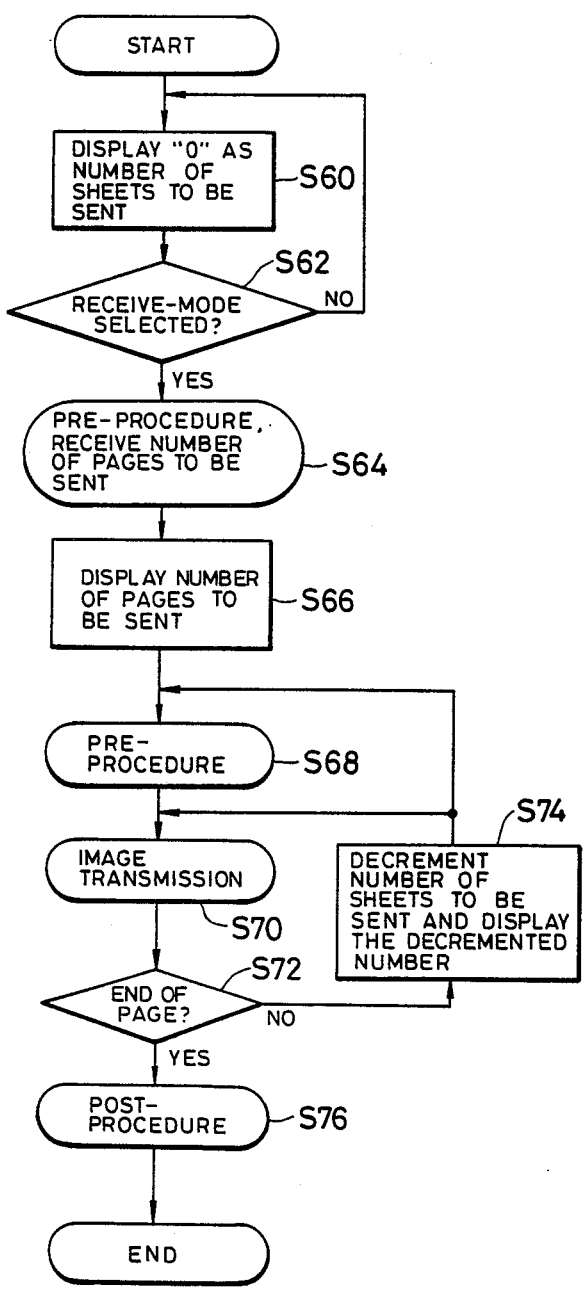

The data communication system having the arrangement described above will be described with reference to flow charts in FIGS. 2 and 3. FIGS. 2 and 3 are respectively flow charts showing parts of send and receive control procedures of the control circuit 32.

In the image send mode, in step S40, the control circuit 32 controls the display circuit 30 through a signal line 32e to display "0" as the number of sheets to be sent.

In order to display the number of remaining sheets in only the store mode, the control circuit 32 determines in step S42 whether the store mode for storing the read image data into a memory is selected. If YES in step S42, the image send data obtained by causing the reader circuit 10 to read the image information and the encoder circuit 12 to encode the image data from the reader circuit 10 sequentially stored in the memory circuit 14. In this case, the number of pages is stored in a predetermined counter by utilizing an output from a known original sensor arranged in the reader circuit 10 to read the image send information in units of pages or sheets.

When the image send data is completely stored in the memory circuit 14, the flow returns to step S40. In this case, the flow jumps from step S42 to step S46. The control circuit 32 determines in step S46 whether the data send mode for sending data from the memory circuit 14 is selected. If YES in step S46, the flow advances to step S48. In this step, the number of sheets to be sent is displayed on the display circuit 30.

In steps S50 and S52, the pre-procedure and image data transmission are performed in the same manner as in a known conventional scheme. In the pre-procedure in step S50, data representing the number of sheets read by a facsimile data field represented by a predetermined procedure signal, e.g., an NSS (Non-Standard System) signal is sent to the destination facsimile system. The destination facsimile system can know how many sheets are sent thereto.

Step S52 represents one-page image transmission. Upon detection of an EOP (End-Of-Page) signal, the flow advances to step S54. The control circuit 32 determines in step S54 whether the currently detected EOP signal is the one for the last page sent to the destination facsimile system.

If NO in step S54, the flow advances to step S56. Every time one page is sent, the number of sheets to be sent, which is set in the counter, is decremented by one. The decremented number is displayed on the display circuit 30.

If the image quality mode or the send mode is not changed, the flow returns from step S56 to step S52. However, if the image quality mode or the send mode is changed, the flow returns from step S56 to step S50.

If the control circuit 32 determines that the last page has been sent to the destination facsimile system, the flow advances to step 58, and the post-procedure is performed in the same manner as in a known post-procedure. Thus, data send processing is ended.

The number of image information sheets to be sent, which data is stored in the memory circuit 14, is displayed on the display circuit 30. The operator can refer to the display content and can determine the end time of the communication currently performed with the destination facsimile system. Therefore, the operator can easily decide proper work procedures to effectively use his time.

The receive mode will be described with reference to FIG. 3.

In the image receive mode, the control circuit 32 causes the display circuit 30 to display "0" as the number of sheets to be sent to the self facsimile system (the number of sheets to be received with respect to the self facsimile system currently serving as a destination system) in step S60 in the same manner as in step S40.

The control circuit 32 determines the pre-procedure in step S62, according to the states of the start key and the communication protocol or procedure, whether the receive mode is set. In step S64, the pre-procedure is performed. In the case of the same facsimile system as that of this embodiment, the number of sheets to be sent can be signalled as described above. Data representing the number of sheets to be sent is stored in a predetermined counter in step S64. In step S66, this data is displayed on the display circuit 30.

Subsequently, the procedures in steps S68 to S76 are the same as those in steps S50 to S58 except that the self facsimile system is not set in the send mode but the receive mode. The count of the counter is decremented for every transmission of one page, and the decremented count is displayed on the display circuit 30.

In the image receive mode, the number of remaining sheets is displayed on the display circuit 30, and the user can determine the end time of the current communication, thereby obtaining the same effect as described above. The above description has been made for the real-time receive mode. However, in the store mode for temporarily storing image data, the number of stored data can be detected. In this case, the number of remaining sheets need not be displayed on the display circuit.

In the above description, the number of sheets to be sent is displayed to signal the communication end timing to the operator. However, the number of imge data stored in the memory circuits 14 and 24 may be displayed on the display circuit 30. Alternatively, the time required for sending the remaining sheets may be roughly calculated on the basis of the number of remaining sheets and the number of image data as well as the processing speed of the reader circuit 10 and a facsimile system to be communicated with the self facsimile system. The calculated time may then be displayed on the display circuit 30. In the above embodiment, the data representing the number of sheets to be sent to the destination facsimile system is sent thereto in the pre-procedure. However, the number of sheets may be signalled every time one page is sent or received. This embodiment exemplifies the facsimile system for converting image data to pixel signals and sending the pixel signals. However, the present invention is applicable to a system for sending character codes, decoding them to image data, and recording the resultant image data.

According to the first embodiment as is apparent from the above description, since an arrangement includes a means for signalling the end timing of the current data communication to the operator, the operator can determine the time when the current data communication is to be completed. He can easily decide the work procedures to the end of the current data communication. Therefore, the data communication system can be effectively utilized and allows the operator to effectively use his own time.

The operation for displaying a time required for data transmission will be described with reference to a second embodiment.

As in the first embodiment, assume that in the second embodiment, the sending system is operated in the store send mode, and the receiving system is not operated in the store receive mode but the normal real-time receive mode.

The transmitter encodes original information and stores the resultant image data in a memory, and at the same time, original size data is stored. For actual data transmission, the send mode is performed in accordance with the capacity of the receiving system. Normally, date is encoded with a highest data compression rate.

In this embodiment, the original sizes are A4, B4, and A3; the send modes are the G2, G3, standard, and fine modes; the encoding schemes are MH (Modified Huffman) coding and MR (Modified READ) coding (for only G3); the sending speeds are 2,400 bps, 4,800 bps, 7,200 bps, and 9,600 bps (for only G3); and minimum send times are 0 msec, 10 msec, and 20 msec (for only G3).

If original information is encoded and stored in a memory, the number of sheets is counted. Upon initiation of facsimile transmission, a send mode, an original size, a sending speed, and a minimum send time are determined in the pre-procedure. Under these conditions, a reference time required for sending one page of the standard original sheet is known. The reference time is multiplied by the number of sheets to derive a total send time.

The send time is displayed on the display circuit so that the operator can know the end time of the current transmission. If the send time is added to the current time, the operator can determine the end time in hours, minutes, and seconds.

When the second page is to be sent upon sending of the first page, the send mode, the original size, the sending speed, and the minimum send time are checked again, and the time required for sending one page of the standard original sheet under these conditions is then calculated. The calculated time is multiplied by the number of remaining sheets, and the resultant value is set again. A difference between the time required for sending one page of the standard original sheet under predetermined conditions and the time required for actually sending one page is absorbed (i.e., the errors are not accumulated).

If the fallback or the like occurs and the sending speed is changed or the send mode (the standard mode, the fine mode or the like) is changed, the send time can be updated to allow display of accurate remaining time.

The receiver detects the number of sheets to be sent thereto in the pre-procedure. The receiver checks the time required for sending one page of the standard original sheet in units of pages under the sending conditions in the same manner as in the transmission section. The calculated time is multiplied by the number of remaining sheets. The resultant time is displayed and the operator can determine the end time of the current transmission.

Figure 4:
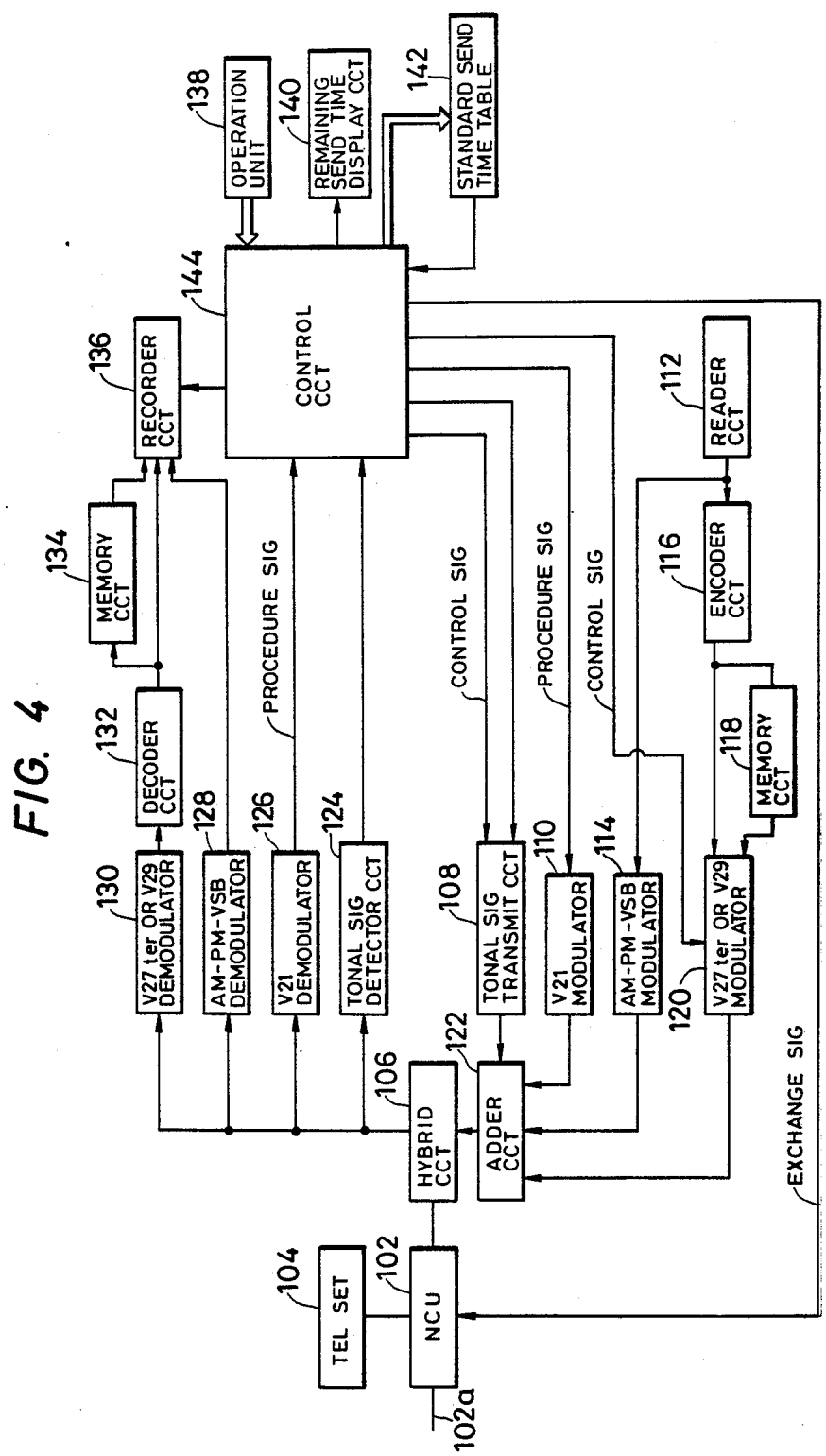
FIG. 4 is a block diagram of a data communication system according to a second embodiment of the present invention.

FIG. 4 is a block diagram of the second embodiment.

Referring to FIG. 4, in order to use the telephone network for data communication, an NCU (Network Control Unit) 102 controls to connect a terminal of a telephone circuit 102a, switches a connection of the telephone circuit to a data transmission line, and holds a loop. More specifically, the NCU 102 connects the telephone circuit 102a to a telephone set 104 if a switching circuit from a control circuit 144 is set at logic "0". However, if an exchange signal is set at logic "1", the NCU 102 connects the telephone circuit 102a to a facsimile system. The telephone circuit 102a is normally connected to the telephone set 104.

The data communication system also includes a hybrid circuit 106 for separating a send signal from a receive signal, a tonal signal generator circuit 108 for generating various tonal signals, and a V21 modulator 110 for performing modulation on the basis of the known CCITT Recommendation V21. The tonal signal generator circuit 108 generates 462 Hz, 1080 Hz, 1650 Hz, 1850 Hz, and 2100 Hz signals. If the control signal from the control signal circuit 144 is set at logic "1", the tonal signal generator circuit 108 generates one of the various tonal signals described above.

A reader circuit 112 sequentially reads one-line image signals from the sending original along the main scanning direction. The reader circuit 112 comprises an image pickup device such as a CCD (Charge-Coupled Device), and an optical system. An AM-PM-VSB modulator 114 performs AM-DM-VSB (Amplitude Modulation-Phase Modulation-Vestigial Sideband Modulation).

An encoder circuit 116 encodes binary data to output MH or MR data.

The data communication system also includes a memory circuit 118, a V27ter (differential phase modulation) or V29 (orthogonal modulation) modulator 120 for performing differential phase or orthogonal modulation based on the CCITT Recommendation V27ter or V29, and an adder circuit 122. The modulator 120 modulates one of the output signals from the encoder circuit 116 and the memory circuit 118 on the basis of the control signals from the control circuit 144.

A tonal signal detector circuit 124 detects a tonal signal included in the receive signal. If the tonal signal detector circuit 124 detects 426 Hz, 1080 Hz, 1650 Hz, 1850 Hz, and 2100 Hz tonal signals, values "1", "2", "3", and "4" are output to the control circuit 144. However, if no tonal signal is detected, the tonal signal detector circuit 124 supplies value "5" to the control circuit 144.

The data communication system of the second embodiment further includes a V21 demodulator 126 for performing modulation based on the CCITT Recommendation V21, an AM-PM-VSB demodulator for performing AM-PM-VSB modulation, a V27ter or V29 demodulator 130 for performing decoding based on the CCITT Recommendation V27ter or V29, a decoder circuit 132 for performing MH or MR decoding, a memory circuit 134, a recorder circuit 136, an operation unit 138, a remaining send time display circuit 140, and a standard send time table 142.

The recorder circuit 136 receives signals from the memory circuit 134, the decoder circuit 132 and the demodulator 128 in response to the control signal from the control circuit 144 and records the monochromatic signal in units of lines.

The operation unit 138 has letter (A to Z) keys, numerical (0 to 9) keys, the * key, the # key, a start key, function keys, a memory key, and the like. The remaining send time display circuit 140 receives the remaining send time (required for completing the current transmission) and displays this time.

The standard send time table 142 receives the original size (A4, B4, or A3), the send mode (G2, G3, standard mode, or fine mode), the coding method (MH or MR), the sending speed (2400, 4800, 7200, or 9600 bps), and the minimum send time (0, 10, or 20 msec). Upon reception of a table search instruction pulse, the standard send time table 142 calculates and outputs time required for sending one page of the standard original sheet on the basis of the stored data.

FIGS. 5A to 5H are tables showing times each required for sending one page of the standard original.

The contents in FIGS. 5A to 5H are examples, and the tables are not limited to these contents. The fine mode is used in place of the standard mode of FIG. 5A, the original size B4 or A3 is used in place of A4 of FIG. 5A, and the sending speed is changed to 9600 bps, as shown in FIGS. 5B to 5H.

The function of the control circuit 144 will be described in detail below.

The function of the control circuit 144 in the send mode will be first described.

The transmitter encodes the original information when the store mode is set to store the image data in a memory. The image data is stored, and the number of sheets is counted. The original information is sent when the data stored in the memory is transmitted. In this case, the time required for sending one page of the standard original sheet under the conditions predetermined in the pre-procedure is read out from the standard send time table 142.

In the G3 send mode, a time obtained by adding the standard send time to a procedure time (i.e., about 3 seconds) is multiplied by the number of sheets, and the resultant send time is displayed. In the G2 send mode, a time obtained by adding the standard send time (about 190 seconds) to a procedure time (i.e., about 21 seconds) is multiplied by the number of sheets to be sent. The send time is updated for every page. The operator at the sending system can therefore easily know the time required for sending the number of remaining sheets.

The function of the control circuit 144 in the receive mode will then be described.

In the receive mode, the receiver detects the number of remaining sheets of the currently sent original in the pre-procedure. The receiver calculates the time required for sending one page of the standard original sheet under the conditions determined in the pre-procedure in the same manner as in the transmitter. The updated send time is read out from the standard send time table 142. More specifically, the procedure time is added to the standard send time, and the resultant time is multiplied by the number of sheets. The time is updated for every one-page transmission. The operator at the receiving system can easily determine the time required for sending the remaining sheets.

The operation of the second embodiment will be described in detail below.

Figure 6:
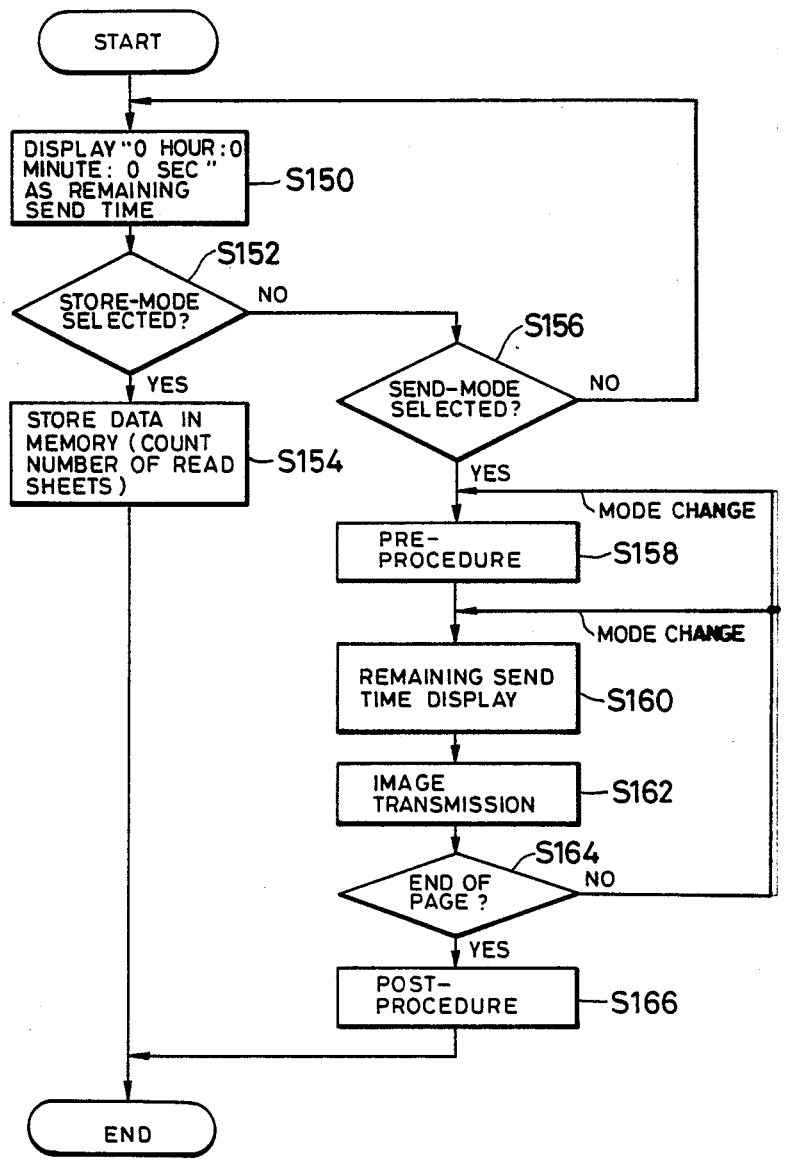
FIG. 6 is a flow chart for explaining the control operation in the transmitter according to the second embodiment.

FIG. 6 is a flow chart for explaining the control operation of the control circuit 144 (FIG. 4) in the sending system.

In the initial state, the telephone circuit 102a is connected to the telephone set 104.

The remaining send time display circuit 140 receives data "0 hour:0 minute:0 second" and displays is (S150). The control circuit 144 determines in step S152 whether the store mode is selected, i.e., whether a function key, the memory key, or the W key is depressed. If YES in step 152, data is stored in the memory (S154). In this case, the number of sheets is also counted.

However, if NO in step S152, i.e., the control circuit 144 determines that the store mode is not selected, the control circuit 144 determines in step S156 whether the send mode is selected, i.e., a function key, the memory key, or the R key is depressed. If NO in step S156, the flow returns to step S150.

However, if the control circuit 144 determines that the send mode is selected, the pre-procedure is performed. In this pre-procedure, the telephone circuit 102a is connected to the facsimile system (S158). The control circuit 144 checks the send mode, the image and send mode, the original size, the original speed (for only G3), the encoding scheme (for only G3), and the minimum send time (for only G3). The procedure time is added to the send time required for sending one page of the standard original sheet under the conditions, and the sum is multiplied by the number of sheets, thereby calculating the remaining send time. The remaining send time is displayed on the display circuit 140 (S160). Thereafter, the post-procedure such as image transmission is performed (S162). The operations in steps S158 to S162 are repeated up to the last page (S164). In the post-procedure, the telephone circuit 102a is connected to the telephone set 104 (S166).

When the flow returns from S164, the pre-procedure (S158) can be omitted without a mode change. However, if the mode is changed, the operations including the pre-procedure (S158) are repeated.

Figure 7:
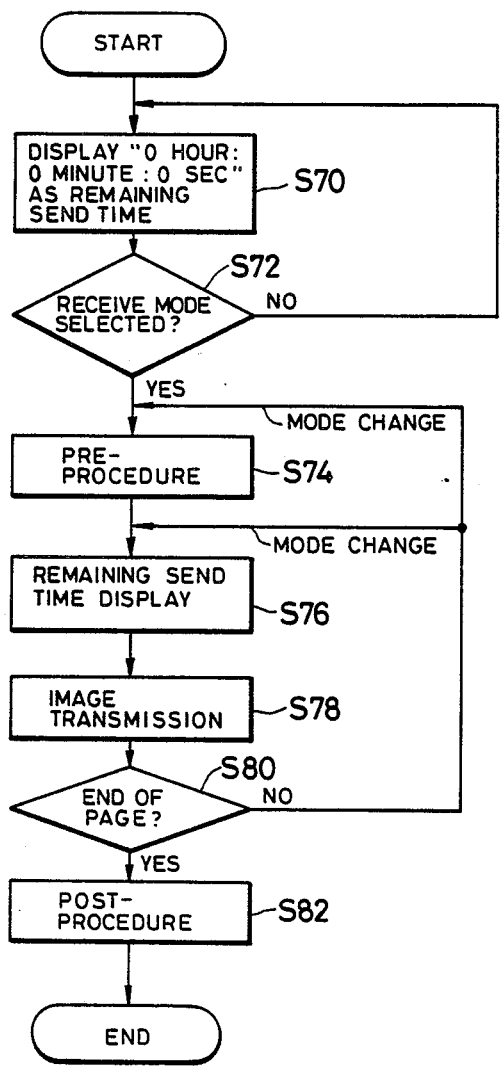
FIG. 7 is a flow chart for explaining the control operation of the receiver according to the second embodiment.

FIG. 7 is a flow chart for explaining the control operation of the control circuit 144 (FIG. 4) in the receiving system.

In the initial state, the telephone circuit 102a is connected to the telephone set 104.

The display circuit 140 receives data "0 hour:0 minute:0 second" and displays it as the remaining send time (S170). If the receive mode is selected (S172), the telephone circuit 102a is connected to the facsimile system, and the pre-procedure is performed (S174). The receiver in the receiving system recognizes the number of sheets on the basis of the NSS (Non-Standard Signal) from the transmitter in the sending system.

The send mode, the image send mode, the original size, the sending speed (for only G3), the encoding scheme (for only G3), and the minimum send time (for only G3) are checked. The procedure time is added to the time required for sending one page of the standard original under these conditions, and the sum is multiplied with the number of sheets to obtain the remaining send time. The remaining send time is displayed on the display circuit 140 (S176).

Image transmission is then performed (S178), and the above operation is repeated up to the last page (S180). Thereafter, the post-procedure is performed to connect the telephone circuit 102a to the telephone set 104 (S182). If no mode change is detected in step S180, the above operation without the pre-procedure (S174) is repeated. However, if a mode change is detected, the above operation including the pre-procedure (S174) is repeated.

As described above, when the operator at the receiving or sending facsimile system wishes to send an original, the operator can determine the end time of the current facsimile transmission if any. Therefore, if the operator judges that the current facsimile transmission will be immediately ended, it is convenient for the operator to wait near the facsimile system. However, if he judges that the current facsimile transmission will not finish soon, he gives up sending the original for the time being and can work on another job. The utilization state of the system can be properly judged by the operator.

In the above embodiment, the time required for sending one page of the standard original sheet is calculated under the current conditions, and the calculated time is multiplied with the number of remaining sheets to obtain a total remaining send time. This operation (i.e., the arithmetic operation) is performed by both the receiving and sending systems. However, such an operation may be performed by only the sending system for every one-page transmission, and the remaining send time may be sent from the sending system to the receiving system.

If a plurality of sheets are to be sent, the numbers of pieces of information of the respective sheets are often substantially identical. Therefore, the time obtained by multiplying the number of remaining sheets with the actual time required for sending one page may be assumed as a total remaining send time.

If the sending system does not have a memory, the number of sheets to be sent may be input at the sending system, and the time required for sending the remaining sheets may be calculated on the basis of the received page number data.

Furthermore, if the sending system has a memory, the number of data to be sent may be calculated. A time obtained by dividing the number of data by the sending speed is added to a time obtained by multiplying the procedure time with the number of sheets to be sent. In this case, the sum may be displayed as the remaining send time. The above calculation must be performed for every one-page transmission to display the remaining send time. Information sent from the sending system to the receiving system may be the number of stored data or the remaining send time. In this case, such information is preferably sent for every page.

The display time may be the read or write and time in place of the send time. Alternatively, both the send and read times or the send and write times may be displayed.

According to the second embodiment, the operator can efficiently utilize the time during the data communication between the sending and receiving facsimile systems.

A third embodiment will be described wherein a time required for data communication is calculated on the basis of the number of data and the communication speed.

The third embodiment will be described with reference to the accompanying drawings.

Figure 8:
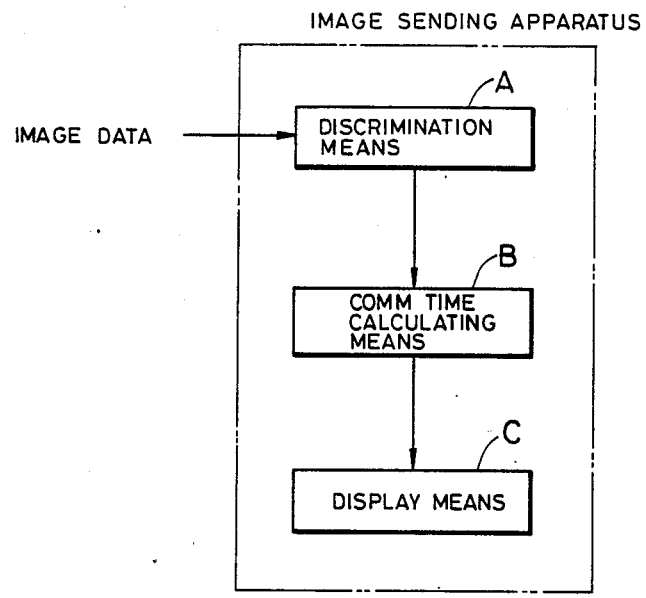
FIG. 8 is a block diagram of a data communication system according to a third embodiment of the present invention.

FIG. 8 shows the schematic configuration of a data communication system according to the third embodiment. The data communication system comprises a discrimination means A for discriminating the number of image data to be sent, a communication time calculating means B for calculating the predetermined time for sending the image data at a predetermined communication speed, and a display means C for displaying the predetermined time.

Figure 9:
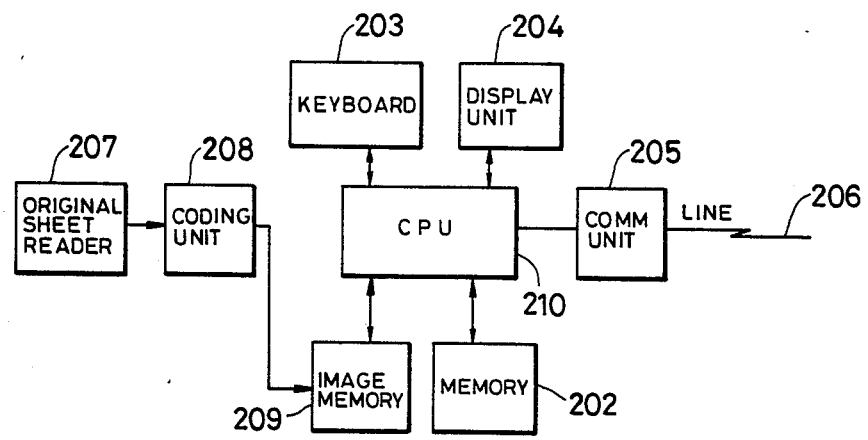
FIG. 9 is a block diagram exemplifying a facsimile system as the third embodiment.

FIG. 9 is a block diagram of a facsimile system of third embodiment. A memory 202 stores data used for operation of a CPU (Central Processing Unit) 210. A keyboard 203 designates whether the required time of the image data is displayed. A display unit 204 displays the depression state of the keyboard 203 and the time required for transmission. A communication unit 205 interfaces a communication line 206 and the facsimile system. The communication line 206 is defined as a circuit for connecting the facsimile system and the public exchange.

The facsimile system also includes an original sheet reader (to be referred to as a reader hereinafter) 207, a coding unit 208 for coding the image data read by the reader 207, and an image memory 209 for temporarily storing the image data coded by the coding unit 208.

The CPU 210 controls the reader 207, the keyboard 203, the display unit 204, the communication unit 205, and the coding unit 208 according to the control procedures or protocol to be described later.

Figure 10:
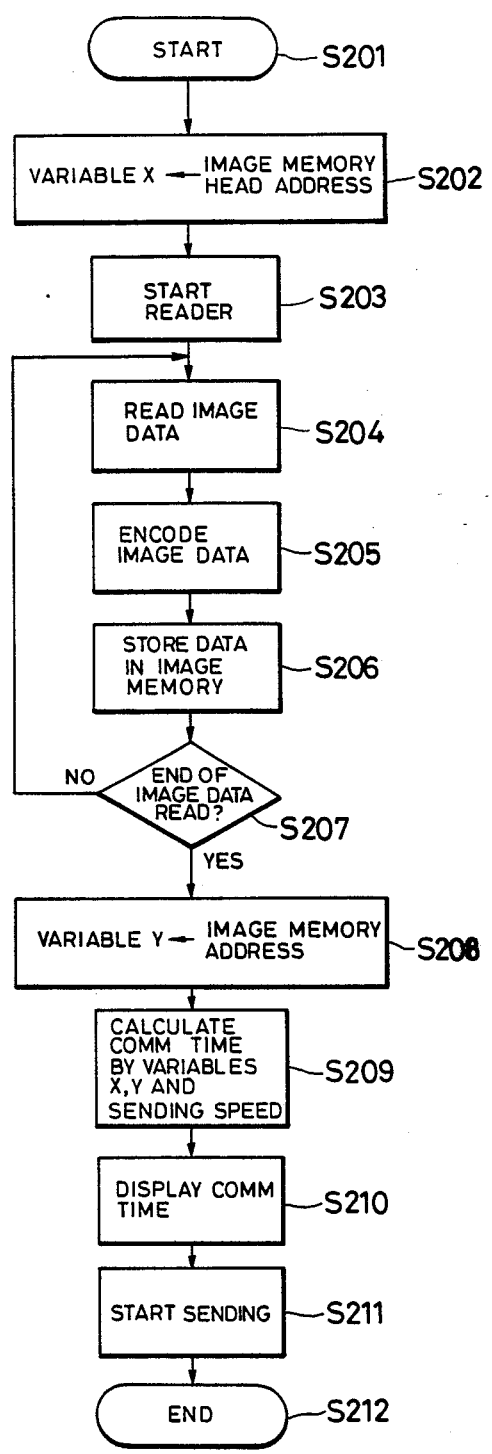
FIG. 10 is a flow chart for explaining the operation of the third embodiment.

The control procedures for displaying the predetermined time required for sending the image data will be described with reference to the flow chart in FIG. 10.

The image read by the reader 207 is stored in the image memory 209 by using the start or head address thereof as a variable X (step S202).

Thereafter, the reader 207 is driven to start reading the image (steps S203 and S204). The image read by the reader 207 is converted by the coding unit 208 into a run-length code (step S205). The run-length code is stored in the image memory (step S206).

The above operations (steps S204 to S207) are repeated until image data is completely read.

The last or end address of the image memory 209 for storing the image data is stored as a variable Y (step S208).

In step S209, the number of image data stored in the image memory is calculated on the basis of the addresses X and Y of the image data. The number of image data and the bit rate of the communication line 206 are used to calculate a time required for transmission. The time is displayed on the display unit 204 (step S210), and image data sending is started (step S211).

In the above embodiment, the time required for sending the image data is digitally displayed. However, bar code display may be utilized to decrease it upon a lapse of the send time, thereby indicating the remaining send time.

The present invention is applicable not only to the facsimile system but also to any other data communication system such as a telex for performing data communication.

According to the present invention, the number of data to be sent can be calculated to signal the time required for communication to the operator, thereby obtaining a convenient data communication system.

The present invention is not limited to the particular embodiments described above. Various changes and modifications may be made within the spirit and scope of the invention.

What we claim is:

1. A data communication apparatus comprising:
   data communication means for performing data communication;
   calculation means for calculating a time required for the completion of the data communication on the basis of the amount of data to be communicated by said data communication means; and
   display means for displaying the remaining time required for completing the data communication for the data which is then being processed by said data communication means in response to the time calculated by said calculation means.

2. An apparatus according to claim 1, wherein said data communication means has a plurality of communication modes and said calculation means calculates the time required for the completion of the data communication on the basis of the amount of data to be communicated and a communication mode of said data communication means.

3. A data communication apparatus according to claim 2, wherein, in the event that the communication mode is changed during the data communication to a new communication mode, said calculation means calculates the required time on the basis of the new communication mode.

4. An apparatus according to claim 2, wherein said calculation means comprises storage means for storing data relating to time required for data communication corresponding to the amount of data and the one communication mode, and calculates the time required for the completion of the data communication based on the time data stored in said storage means and wherein said display means displays the required time.

5. An apparatus according to claim 1, wherein the communication data is coded data.

6. A data communication apparatus according to claim 1, wherein said data communication means is constructed to perform both data reception and data transmission and wherein said calculation means calculates a time required for receiving, at a receiver end of said apparatus, data transmitted from a transmitter end of said apparatus, the calculation being on the basis of the amount of the data which is to be transmitted from said transmitter end and being prior to reception of the data at said receiver end.

7. A data communication apparatus according to claim 1, further comprising a memory for storing the data to be communicated by said data communication means, wherein said calculation means calculates the time required for the completion of the data communication on the basis of the amount of the data stored in the memory.

8. A data communication apparatus according to claim 1, further comprising means for inputting the data to be communicated by said data communication means, wherein said calculation means calculates the time required for completion of the data communication on the basis of the amount of the data input by said input means.

9. A data communication apparatus according to claim 1, wherein said data communication means performs data communication for image data and in the case of the data communication of a plurality of pages, said calculation means calculates the time required for the completion of the data communication for remaining data whenever one page of the image data has been completely communicated.

10. A data communication apparatus according to claim 1, wherein said display means sequentially updates the displayed time in response to a remaining time required to complete communication of data remaining to be communicated, as reflected by a difference calculated by said calculation means between the time calculated by said calculation means and a time elapsed since beginning of data communication.

11. A data communication apparatus according to claim 10, wherein said data communication means performs data communication of image data and said display means updates the displayed time for data communication for each page of the image data.

12. A data communication apparatus according to claim 1, wherein said display means displays the remaining time in a period during the data communication by said data communication means.

13. A data communication apparatus comprising:
   data communication means capable of communicating data in a selected one of a plurality of communication modes;
   a memory for storing time data relating to a time required for data communication, the time data corresponding to an amount of data to be communicated and one of the communication modes; and
   calculation means for reading corresponding time data from said memory in response to the amount of data to be communicated by said data communication means and to the selected communication mode in which the data is to be communicated, and for calculating a time required for the completion of the data communication on the basis of the time data read from said memory.

14. A data communication apparatus according to claim 13, further comprising means for displaying the required time calculated by said calculation means.

15. A data communication apparatus according to claim 3, wherein, when the communication mode is changed to a new one during the data communication, said calculation means accesses to the memory in response to the amount of data remaining to be communicated and to the new communication mode and calculates a time required for completion of the data communication.

16. A data communication apparatus according to claim 13, wherein said data communication means communicates image data, and the communication mode represents a data communication rate and image data line density.

* * * * *

UNITED STATES PATENT AND TRADEMARK OFFICE
CERTIFICATE OF CORRECTION

PATENT NO. : 4,894,843

DATED : January 16, 1990

INVENTOR(S) : TAKEHIRO YOSHIDA ET AL.

It is certified that error appears in the above-identified patent and that said Letters Patent is hereby corrected as shown below:

COLUMN 1

Line 22, "sent" should read --send--.

COLUMN 3

Line 66, "sequentially" should read --is sequentially--.

COLUMN 10

Line 10, "and" should read --end--.

COLUMN 12

Line 57, "claim 3," should read --claim 13,--.

Signed and Sealed this

Eleventh Day of February, 1992

Attest:

HARRY F. MANBECK, JR.

Attesting Officer　　　Commissioner of Patents and Trademarks